(12) United States Patent
Chen et al.

(10) Patent No.: US 10,190,026 B2
(45) Date of Patent: *Jan. 29, 2019

(54) WOOD ADHESIVE

(71) Applicant: INDUSTRIAL TECHNOLOGY RESEARCH INSTITUTE, Hsinchu (TW)

(72) Inventors: Man-Lin Chen, Miaoli County (TW); Hsien-Kuang Lin, Hsinchu (TW); Der-Jaw Chan, Zhudong Township, Hsinchu County (TW); Sue-May Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 160 days.

This patent is subject to a terminal disclaimer.

(21) Appl. No.: 15/011,472

(22) Filed: Jan. 29, 2016

(65) Prior Publication Data

US 2017/0081563 A1 Mar. 23, 2017

(30) Foreign Application Priority Data

Sep. 18, 2015 (TW) .............................. 104130928 A

(51) Int. Cl.
| | |
|---|---|
| *C09J 109/06* | (2006.01) |
| *C09J 101/28* | (2006.01) |
| *C09J 177/00* | (2006.01) |
| *C08L 9/06* | (2006.01) |
| *C08L 25/04* | (2006.01) |
| *C08L 79/02* | (2006.01) |

(52) U.S. Cl.
CPC ............ *C09J 101/286* (2013.01); *C08L 9/06* (2013.01); *C08L 25/04* (2013.01); *C08L 79/02* (2013.01); *C09J 109/06* (2013.01); *C09J 177/00* (2013.01)

(58) Field of Classification Search
CPC .... C09J 101/286; C09J 109/06; C09J 177/00; C08L 79/02; C08L 9/06; C08L 25/04
See application file for complete search history.

(56) References Cited

U.S. PATENT DOCUMENTS

| | | | |
|---|---|---|---|
| 3,931,088 | A | 1/1976 | Sakurada et al. |
| 6,359,040 | B1 | 3/2002 | Burdick |
| 6,585,997 | B2 | 7/2003 | Moro et al. |
| 6,960,617 | B2 | 11/2005 | Omidian et al. |
| 7,060,798 | B2 | 6/2006 | Li et al. |
| 7,179,528 | B2 | 2/2007 | Suzuki et al. |
| 7,252,735 | B2 | 8/2007 | Li |
| 7,265,169 | B2 | 9/2007 | Li et al. |
| 7,393,930 | B2 | 7/2008 | Li et al. |
| 7,416,598 | B2 | 8/2008 | Sun et al. |
| 7,722,712 | B2 | 5/2010 | Li |
| 7,736,559 | B2 | 6/2010 | Rivers et al. |
| 7,785,440 | B2 | 8/2010 | Li |
| 8,728,047 | B2 | 5/2014 | Ciok |
| 2011/0293932 | A1 | 12/2011 | Jiang et al. |
| 2012/0115992 | A1 | 5/2012 | Khabbaz et al. |
| 2012/0183794 | A1 | 7/2012 | Guo et al. |
| 2015/0232724 | A1 | 8/2015 | Chen et al. |

FOREIGN PATENT DOCUMENTS

| | | |
|---|---|---|
| CN | 1300309 A | 6/2001 |
| CN | 100503761 C | 6/2009 |
| CN | 101497772 A | 8/2009 |
| CN | 103153563 A | 6/2013 |
| CN | 104479596 A | 4/2015 |
| EP | 1180559 A1 | 2/2002 |
| JP | S55-005937 A | 1/1980 |
| JP | 2007-131747 A | 5/2007 |
| JP | 2008-189839 A | 8/2008 |
| TW | 200829655 A | 7/2008 |
| TW | I319426 B | 1/2010 |
| TW | 201533186 A | 9/2015 |
| WO | WO 2008-024444 A3 | 2/2008 |
| WO | WO 2011-009812 A1 | 1/2011 |

OTHER PUBLICATIONS

Jingxi Youji, "Huagong chanpin Shengchan Jishu Shouce," pp. 1659-1662, Jun. 30, 2010, English abstract.
Hercules Aqualon, "Sodium Carboxymethylcellulose Physical and Chemical Properties," Apr. 2002.
Chinese Office Action dated May 27, 2017.
Japanese Office Action dated Jul. 18, 2017.
U.S. Office Action dated Jun. 13, 2017, for related U.S. Appl. No. 14/509,746.
Taiwanese Office Action dated Mar. 3, 2016.
Taiwanese Office Action dated Apr. 22, 2015.
Extended European Search Report dated Dec. 22, 2016.
Chinese Office Action dated Nov. 2, 2016.
Hisham A. Essawy et al., "Improving the Performance of Urea-Formaldehyde Wood Adhesive System Using Dendritic Poly(amidoamine)s and their Corresponding Half Generations", Journal of Applied Polymer Science DOI 10.1002/app, pp. 1349-1355, Jun. 18, 2009.
Kaichang Li et al., "Formaldehyde-Free Wood Adhesives from Decayed Wood", 2005 Wiley-VCH Verlag GmbH & Co. KGaA, Weinheim, pp. 529-532, 2005.
A. Despres et al., "Formaldehyde-Free Aminoresin Wood Adhesives Based on Dimethoxyethanal", Journal of Applied Polymer Science, vol. 110, 3908-3916 (2008) VVC 2008 Wiley Periodicals, Inc., pp. 3909-3916, 2008.
Yonghwan Jang et al., "A new formaldehyde-free wood adhesive from renewable materials", international Journal of Adhesion & Adhesives 31, pp. 754-759, 2011.
Syed H. Imam et al., "Wood Adhesive from Crosslinked Poly(Vinyl Alcohol) and Partially Gelatinized Starch: Preparation and Properties", © Wiley-VCH Verlag GmbH, D-69451 Weinheim, pp. 225-229, 1999.

(Continued)

*Primary Examiner* — Peter D. Mulcahy
(74) *Attorney, Agent, or Firm* — Rabin & Berdo, P.C.

(57) ABSTRACT

A wood adhesive is provided. The wood adhesive includes a first agent and a second agent. The first agent includes a sodium carboxymethyl cellulose and a styrene-butadiene rubber polymer. The sodium carboxymethyl cellulose has a molecular weight between 15,000 and 500,000 and a degree of substitution of from 0.4 to 2.00 of the sodium salt. The second agent includes a polymeric quaternary amine.

9 Claims, No Drawings

(56) References Cited

OTHER PUBLICATIONS

Syed H. Imam et al., "Environmentally friendly wood adhesive from a renewable plant polymer: characteristics and optimization", Polymer Degradation and Stability 73, pp. 529-533, 2001.
Yuan Liu et al., "Modification of Soy Protein for Wood Adhesives using Mussel Protein as a Model: The Influence of a Mercapto Group", Macromol. Rapid Commun., pp. 1835-1838, 2004.

WOOD ADHESIVE

This application claims the benefit of Taiwan application Serial No. 104130928, filed Sep. 18, 2015, the disclosure of which is incorporated by reference herein in its entirety.

TECHNICAL FIELD

The disclosure relates in general to an adhesive, and more particularly to a wood adhesive.

BACKGROUND

Wood adhesive is a most commonly used adhesive, and has a total usage amount over a half of the total usage of adhesives. More than 80% of wood adhesives include at least one of a urea-formaldehyde resin and a phenolic-formaldehyde resin. However, the said resin will release a formaldehyde gas for even more than ten years due to their curing mechanism, not only seriously polluting the environment but also causing harm to human bodies. Therefore, it has become a prominent task for the technology field of wood adhesive to resolve the said problems of formaldehyde gas releasing and environmental pollution.

SUMMARY

According to one embodiment of the disclosure, a wood adhesive is provided. The wood adhesive includes a first agent and a second agent. The first agent includes a sodium carboxymethyl cellulose and a styrene-butadiene rubber polymer. The sodium carboxymethyl cellulose has a molecular weight between 15,000 and 500,000 and a degree of substitution of from 0.4 to 2.00 of the sodium salt. The second agent includes a polymeric quaternary amine.

The above embodiments of the disclosure will become better understood with regard to the following detailed description of the preferred but non-limiting embodiment (s).

BRIEF DESCRIPTION OF THE DRAWINGS

None.

DETAILED DESCRIPTION

The disclosure is related to a wood adhesive. The wood adhesive includes a sodium carboxymethyl cellulose, a polymeric quaternary amine and a styrene-butadiene rubber polymer. The wood adhesive possesses excellent adhesion and water resistance, and is capable of resolving the problem of formaldehyde gas releasing and environmental pollution.

In an embodiment of the disclosure, the wood adhesive may include a first agent and a second agent. The first agent and the second agent may be stored separately when not in use, and mixed when in use, but the disclosure is not limited thereto.

In an embodiment, the first agent is a main agent, and may include a sodium carboxymethyl cellulose (or sodium salt of carboxymethyl ether of cellulose) and a styrene-butadiene rubber (SBR) polymer. The sodium carboxymethyl cellulose has a structure as indicated in Chemical Formula 1, wherein R represents $CH_2CO_2Na$ or H, and n is an integer.

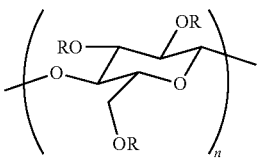

[Chemical Formula 1]

The sodium carboxymethyl cellulose has a molecular weight between about 15,000 and 500,000 and a degree of substitution from about 0.4 to 2.00 of the sodium salt. Here, the "degree of substitution" may be defined as the average number of carboxymethyl in each glucose unit of cellulose. In some embodiments, the first agent may further include water, and both the sodium carboxymethyl cellulose and the styrene-butadiene rubber polymer may exist in aqueous phase, but the disclosure is not limited thereto.

In an embodiment, the second agent is a hardening agent, and may include a polymeric quaternary amine. In some embodiments, the polymeric quaternary amine may be formed by the reaction of polyamidoamine with epichlorohydrin. The polymeric quaternary amine may have the unit as indicated in Chemical Formula 2, wherein m is an integer and may be between 10 and 10,000.

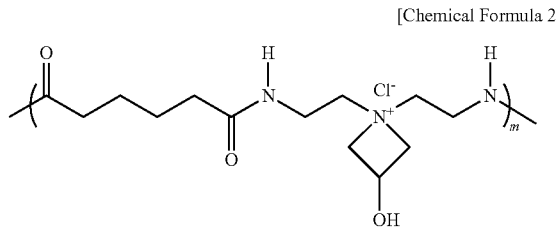

[Chemical Formula 2]

Similarly, the second agent may further include water, and the polymeric quaternary amine exists in aqueous phase, but the disclosure is not limited thereto. In an embodiment, the weight ratio of the styrene-butadiene rubber polymer to the sum of weights the sodium carboxymethyl cellulose and the polymeric quaternary amine may be from 0.05:1 to 1:0.1, and the weight ratio of the sodium carboxymethyl cellulose to the polymeric quaternary amine may be from 0.05:1 to 1:0.05.

In some embodiments, the wood adhesive may include many additives such as at least one of an inorganic substance and an organic filler. For example, the organic filler may include at least one of flour, starch and sawdust, and the inorganic substance may include a flame retardant. These additives may be added to the first agent or the second agent directly or added to the wood adhesive after the wood adhesive is mixed.

The wood adhesive in the embodiments of the disclosure uses a bio-based material as the main agent, hence being free of formaldehyde.

The wood adhering method using the wood adhesive of the above embodiments includes following steps of: providing a first block and a second block, and jointing the first block to the second block with the wood adhesive. For example, the first block and the second block may be pre-treated, such as heated for a period of time, to get rid of moisture, essential oil and volatile substance and kill eggs of insects. The user may mix the first agent and the second agent when the user wants to joint the first block to the second block. In some embodiments, the weight ratio of the first agent to the second agent may be from 0.25:1 to 1:0.0.5 or from 0.7:1 to 1:0.2.

Then, the wood adhesive is applied on the joint surface of the first block and/or the joint surface of the second block (such as by way of coating). For example, the wood adhesive may be applied on one or both of the joint surfaces of the two blocks. After that, the wood adhesive may be pressed to become hardened. In some embodiments, the wood adhesive is pressed with a pressure about 10 kg/cm² at a temperature about 5-45° C. for about 1050 minutes, and then is further pressed with a pressure about 10 kg/cm² at a temperature about 80-140° C. for about 3-25 minutes to expedite the hardening of the wood adhesive.

The hardening of the wood adhesive in the embodiments of the disclosure may include many reaction mechanisms. One reaction mechanism is the cross-linking of the polymeric quaternary amine itself, and the product of the cross-linking reaction may be expressed in Chemical Formula 3, wherein R' represents the polymeric quaternary amine.

[Chemical Formula 3]

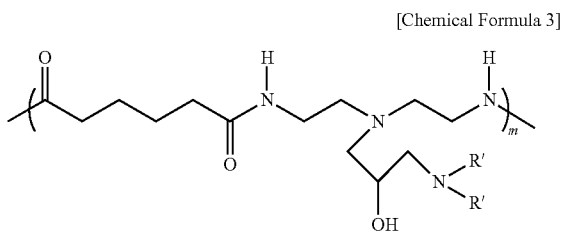

Another reaction mechanism is the hydroxy reaction of the polymeric quaternary amine with the hydroxy of the sodium carboxymethyl cellulose, the hydroxy of the first block cellulose or the hydroxy of the second block cellulose to form an —O— bond, and the product may be expressed in Chemical Formula 4, wherein R" represents the sodium carboxymethyl cellulose or cellulose.

[Chemical Formula 4]

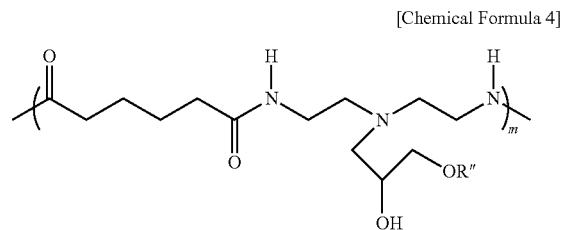

An alternate reaction mechanism is the carboxylate anion reaction of the polymeric quaternary amine with the sodium carboxymethyl cellulose to form a —COO— bond, and the product may be expressed in Chemical Formula 5, wherein R''' represents the sodium carboxymethyl cellulose.

[Chemical Formula 5]

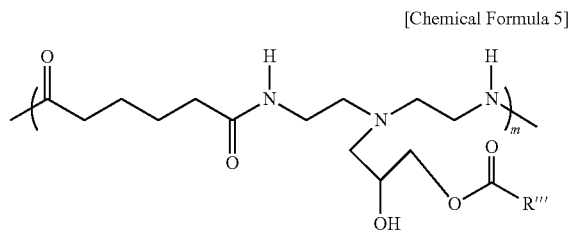

In some embodiments, the styrene-butadiene rubber polymer may include carboxylate anion (—COO⁻). That is, the styrene-butadiene rubber polymer may cross-link with the polymeric quaternary amine, but the disclosure is not limited thereto.

Furthermore, the blocks may be jointed with the wood adhesive in the embodiments of the disclosure through a plurality of reaction mechanisms to achieve excellent jointing properties.

In an embodiment, at least one of the first block and the second block may include at least one of a particleboard, an oriented strand board, a fiberboard, a plywood, a block board and a laminated board.

A number of examples in conjunction with comparison examples are described below to make the wood adhesive in the embodiments of the disclosure easier to understand.

Firstly, a water solution of sodium carboxymethyl cellulose was prepared. Four reaction bottles were prepared, and 900 g of deionized water were added to the reaction bottles. Then, 100 g of carboxymethyl cellulose (PR, manufactured by DKS Co. Ltd.) having a molecular weight between 47,000 and 54,000 and a degree of substitution of from 0.6 and 0.7 of the sodium salt was slowly added to the deionized water in the reaction bottles. Then, the reaction bottles were oil-bathed at 50° C. and stirred at a speed of 250 rpm for more than 24 hours, such that the carboxymethyl cellulose may be well dissolved in the water solution. After the water solution in the reaction bottles was cooled, a water solution of sodium carboxymethyl cellulose having a weight ratio of 10 wt % would be obtained. The obtained water solution is referred as water solution I hereinafter.

Example 1

After 4.2 g of styrene-butadiene rubber resin (TK-61F, manufactured by Croslene Chemical Industries. Ltd., PH=8.5, solid content 48%, viscosity 62 cps) were added to 50.0 g of water solution I and stirred uniformly, 1.33 g of NaOH water solution (10%) were added thereto and together were stirred uniformly. Then, 40.0 g of polyamidoamine-epichlorohydrin resin water solution (Kymene® 557H, manufactured by Hercules Ltd., PH=4.2, solid content 12.5%) and 8 g of flour were further added thereto and together were stirred uniformly to form a wood adhesive A.

Then, the viscosity of the wood adhesive A was measured with a viscometer 30 minutes after the wood adhesive A was formed ([test 1]). If the viscosity was between 3,000 and 15,000 cps, the wood adhesive A may be smoothly used for roller coating; otherwise, the wood adhesive A may not be smoothly used for roller coating.

Meanwhile, a wood adhesion water resistance test was performed on the wood adhesive A. Firstly, wood specimens A-1 and A-2 were prepared.

The wood adhesive A was coated on four 30 cm×30 cm *eucalyptus* veneers with a coating roller (coating amount 1.1 g/cm²). Then, an uncoated veneer was prepared, and the four coated *eucalyptus* veneers together with the uncoated veneer were stacked with the fiber directions being perpendicular to one another. Then, the five stacked veneers were cool-pressed (10 kg/cm²) at room temperature for 50 minutes, and were further hot-pressed and hardened (10 kg/cm²) at 110° C. for 20 minutes to form a five-layer plywood. Then, the specimen was cut at a size of 7.5 cm×7.5 cm to form the wood specimen A-1.

The wood adhesive A was coated between two wood chips, wherein the coating area was 1 cm², the coating amount was 1.1 g/cm², and each wood chip was a 10 cm×1 cm strip such that universal testing machine may conveniently perform a tensile test on the wood chips. After the wood chips were stacked, the stacked wood chips were cold-pressed (10 kg/cm$^2$) at a room temperature for 50 minutes, and were further hot-pressed and hardened (10 kg/cm$^2$) at 110° C. for 20 minutes to form the wood specimen A-2.

Then, a water resistance test for wood adhesion was performed on the wood specimens A-1 and A-2 ([test 2], [test 3] and [test 4]). In test 2, after the wood specimens A-1 and A-2 were soaked in 70° C. warm water for 2 hours, the wood specimens A-1 and A-2 were placed in the oven at 60° C. for 3 hours. Then, whether the plywood of the wood specimen A-1 generates cracks was checked, and a tensile test was performed on the wood specimen A-2. In test 3, after the wood specimens A-1 and A-2 were soaked in 100° C. boiling water for 4 hours, the wood specimens A-1 and A-2 were placed in the oven at 60° C. for 20 hours. Then, whether the plywood of the wood specimen A-1 generates cracks was checked, and a tensile test was performed on the wood specimen A-2. In test 4, after the wood specimens A-1 and A-2 were soaked in 100° C. boiling water for 4 hours, the wood specimens A-1 and A-2 were placed in the oven at 60° C. for 20 hours. Following that, the wood specimens A-1 and A-2 were soaked in 100° C. boiling water for 4 hours and then were placed in the oven at 60° C. for 3 hours. Then, whether the plywood of the wood specimen A-1 generates cracks was checked, and a tensile test was performed on the wood specimen A-2. The tensile test employs a double column tensile testing machine (Cometech Testing Machines Co., Ltd.).

Example 2

After 10.4 g of styrene-butadiene rubber resin (TK-61F, manufactured by Croslene Chemical Industries. Ltd., PH=8.5, solid content 48%, viscosity 62 cps) were added to 50.0 g of water solution I and stirred uniformly, 1.33 g of NaOH water solution (10%) were added thereto and together were stirred uniformly. Then, 40.0 g of polyamidoamine-epichlorohydrin resin water solution (Kymene® 557H, manufactured by Hercules Ltd., PH=4.2, solid content 12.5%) and 8 g of flour were further added thereto and together were stirred uniformly to form a wood adhesive B.

Then, the viscosity of the wood adhesive B was measured with a viscometer 30 minutes after the wood adhesive B was formed ([test 1]). If the viscosity was between 3,000 and 15,000 cps, the wood adhesive B may be smoothly used for roller coating; otherwise, the wood adhesive B may not be smoothly used for roller coating.

Meanwhile, a wood adhesion water resistance test was performed on the wood adhesive B. Firstly, wood specimens B-1 and B-2 were prepared.

The wood adhesive B was coated on four 30 cm×30 cm *eucalyptus* veneers with a coating roller (coating amount 1.1 g/cm$^2$). Then, an uncoated veneer was prepared, and the four coated *eucalyptus* veneers together with the uncoated veneer were stacked with the fiber directions being perpendicular to one another. Then, the five stacked veneers were cool-pressed (10 kg/cm$^2$) at room temperature for 50 minutes, and were further hot-pressed and hardened (10 kg/cm$^2$) at 110° C. for 20 minutes to form a five-layer plywood. Then, the specimen was cut at a size of 7.5 cm×7.5 cm to form the wood specimen B-1.

The wood adhesive B was coated between two wood chips, wherein the coating area was 1 cm$^2$, the coating amount was 1.1 g/cm$^2$, and each wood chip was a 10 cm×1 cm strip such that universal testing machine may conveniently perform a tensile test on the wood chips. After the wood chips were stacked, the stacked wood chips were cold-pressed (10 kg/cm$^2$) at room temperature for 50 minutes, and were further hot-pressed and hardened (10 kg/cm$^2$) at 110° C. for 20 minutes to form the wood specimen B-2.

Then, a water resistance test for wood adhesion was performed on the wood specimens B-1 and B-2 ([test 2], [test 3] and [test 4]). In test 2, after the wood specimens B-1 and B-2 were soaked in 70° C. warm water for 2 hours, the wood specimens B-1 and B-2 were placed in the oven at 60° C. for 3 hours. Then, whether the plywood of B-1 plywood generates cracks was checked, and a tensile test was performed on the wood specimen B-2. In test 3, after the wood specimens B-1 and B-2 were soaked in 100° C. boiling water for 4 hours, the wood specimens B-1 and B-2 were placed in the oven at 60° C. for 20 hours. Then, whether the plywood of B-1 plywood generates cracks was checked, and a tensile test was performed on the wood specimen B-2. In test 4, after the wood specimens B-1 and B-2 were soaked in 100° C. boiling water for 4 hours, the wood specimens B-1 and B-2 were placed in the oven at 60° C. for 20 hours. Following that, the wood specimens B-1 and B-2 were soaked in 100° C. boiling water for 4 hours and then were placed in the oven at 60° C. for 3 hours. Then, whether the plywood of B-1 generates cracks was checked, and a tensile test was performed on the wood specimen B-2. The tensile test employs a double column tensile testing machine (Cometech Testing Machines Co., Ltd.).

Comparison Example 1

After 1.33 g of NaOH water solution (10%) were added to 50.0 g of water solution I and stirred uniformly, 40.0 g of polyamidoamine-epichlorohydrin resin water solution (Kymene® 557H, manufactured by Hercules Ltd., PH=4.2, solid content 12.5%) and 8 g of flour were further added thereto and together were stirred uniformly to form a wood adhesive C.

Then, the viscosity of the wood adhesive C was measured with a viscometer 30 minutes after the wood adhesive C was formed ([test 1]). If the viscosity was between 3,000 and 15,000 cps, the wood adhesive C may be smoothly used for roller coating; otherwise, the wood adhesive C may not be smoothly used for roller coating.

Meanwhile, a water resistance test for wood adhesion was performed on the wood adhesive C. Firstly, wood specimens C-1 and wood specimen C-2 were prepared.

The wood adhesive C was coated on tour 30 cm×30 cm *eucalyptus* veneers with a coating roller (coating amount 1.1 g/cm$^2$). Then, an uncoated veneer was prepared, and the four coated *eucalyptus* veneers together with the uncoated veneer were stacked with the fiber directions being perpendicular to each other. Then, the five stacked veneers were cool-pressed (10 kg/cm$^2$) at room temperature for 50 minutes, and were further hot-pressed and hardened (10 kg/cm$^2$) at 110° C. for 20 minutes to form a five-layer plywood. Then, the specimen was cut at a size of 7.5 cm×7.5 cm to form the wood specimen C-1.

The wood adhesive C was coated between two wood chips, wherein the coating area was 1 cm$^2$, the coating amount was 1.1 g/cm$^2$, and each wood chip was a 10 cm×1 cm strip such that universal testing machine can conveniently perform a tensile test on the wood chips. After the wood chips were stacked, the stacked wood chips were cold-pressed (10 kg/cm$^2$) at room temperature for 50 minutes, and were further hot-pressed and hardened (10 kg/cm$^2$) at 110° C. for 20 minutes to form the wood specimen C-2.

Then, a water resistance test for wood adhesion was performed on the wood specimens C-1 and C-2 ([test 2], [test 3] and [test 4]). In test 2, after the wood specimens C-1 and C-2 were soaked in 70° C. warm water for 2 hours, the wood specimens C-1 and C-2 were placed in the oven at 60° C. for 3 hours. Then, whether the plywood of C-1 plywood generates cracks was checked, and a tensile test was performed on the wood specimen C-2. In test 3, after the wood specimens C-1 and C-2 were soaked in 100° C. boiling water for 4 hours, the wood specimens C-1 and C-2 were placed in the oven at 60° C. for 20 hours. Then, whether the plywood of C-1 plywood generates cracks was checked, and a tensile test was performed on the wood specimen C-2. In test 4, after the wood specimens C-1 and C-2 were soaked in 100° C. boiling water for 4 hours, the wood specimens C-1 and C-2 were placed in the oven at 60° C. for 20 hours. Following that, the wood specimens C-1 and C-2 were soaked in 100° C. boiling water for 4 hours and then were placed in the oven at 60° C. for 3 hours. Then, whether the plywood of C-1 generates cracks was checked, and a tensile test was performed on the wood specimen C-2. The tensile test employs a double column tensile testing machine (Cometech Testing Machines Co., Ltd.).

The test results of [Example 1], [Example 2] and [Comparison Example 1] were shown in Table 1. It can be known from Table 1 that styrene-butadiene rubber resin increases water resistance of the wood adhesive. That is, both the wood adhesives of [Example 1] and [Example 2] were superior to the wood adhesive of [Comparison Example 1] in terms of water resistance. Given that each wood adhesive contains a different amount of styrene-butadiene rubber resin, the water resistance of the wood adhesive of [Example 2] was still superior to the water resistance of the wood adhesive of [Example 1].

TABLE 1

| Composition formula and test result | | Example 1 | | Example 2 | | Comparison Example 1 | |
|---|---|---|---|---|---|---|---|
| | | Amount actually added (g) | Weight Ratio by 100% solid content | Amount actually added (g) | Weight Ratio by 100% solid content | Amount actually added (g) | Weight Ratio by 100% solid content |
| Water solution I | | 50 | 1 | 50 | 1 | 50 | 1 |
| styrene-butadiene rubber resin | | 4.2 | 0.4 | 10.42 | 1 | 0 | 0 |
| Kymene ® 557H water solution | | 40 | 1 | 40 | 1 | 40 | 1 |
| Flour | | 8 | 1.6 | 8 | 1.6 | 8 | 1.6 |
| Test 1 | | Successful (5100 cps) | | Successful (5080 cps) | | Successful (5060 cps) | |
| Test 2 | Cracks? | N | | N | | N | |
| | Tension (g/cm$^2$) | >12.3 (broke up) | | >13.5 (broke up) | | >12.3 (broke up) | |
| Test 3 | Cracks? | N | | N | | Y | |
| | Tension (g/cm$^2$) | >14.3 (broke up) | | >15.2 (broke up) | | 0.8 | |
| Test 4 | Cracks? | Y | | N | | Y | |
| | Tension (g/cm$^2$) | 2.5 | | >13.3 (broke up) | | 0 | |

Example 3

After 15.0 g of water solution I was added to 31.26 g of styrene-butadiene rubber resin (TK-61F, manufactured by Croslene Chemical Industries. Ltd., PH=8.5, solid content 48%, viscosity 62 cps) and stirred uniformly, 1.33 g of NaOH water solution (10%) were added thereto and together were stirred uniformly. Then, 40.0 g of polyamidoamine-epichlorohydrin resin water solution (Kymene® 557H, manufactured by Hercules Ltd., PH=4.2, solid content 12.5%) and 8 g of flour were further added thereto and together were stirred uniformly to form a wood adhesive D.

Then, the viscosity of the wood adhesive D was measured with a viscometer 30 minutes after the wood adhesive D was formed ([test 1]). If the viscosity was between 3,000 and 15,000 cps, the wood adhesive may be smoothly used for roller coating; otherwise, the wood adhesive may not be smoothly used for roller coating.

Meanwhile, a water resistance test for wood adhesion was performed on the wood adhesive D. Firstly, wood specimens D-1 and D-2 were prepared.

The wood adhesive D was coated on four 30 cm×30 cm *eucalyptus* veneers with a coating roller (coating amount 1.1 g/cm$^2$). Then, an uncoated veneer was prepared, and the four coated *eucalyptus* veneers together with the uncoated veneer were stacked with the fiber directions being perpendicular to each other. Then, the five stacked veneers were cool-pressed (10 kg/cm$^2$) at room temperature for 50 minutes, and were further hot-pressed and hardened (10 kg/cm$^2$) at 110° C. for 20 minutes to form a five-layer plywood. Then, the specimen was cut at a size of 7.5 cm×7.5 cm to form the wood specimen D-1.

The wood adhesive D was coated between two wood chips, wherein the coating area was 1 cm$^2$, the coating amount was 1.1 g/cm$^2$, and each wood chip was a 10 cm×1 cm strip such that universal testing machine can conveniently perform a tensile test on the wood chips. After the wood chips were stacked, the stacked wood chips were cold-pressed (10 kg/cm$^2$) at room temperature for 50 minutes, and were further hot-pressed and hardened (10 kg/cm$^2$) at 110° C. for 20 minutes to form the wood specimen D-2.

Then, a water resistance test for wood adhesion was performed on the wood specimens D-1 and D-2 ([test 2], [test 3] and [test 4]). In test 2, after the wood specimens D-1 and D-2 were soaked in 70° C. warm water for 2 hours, the wood specimens D-1 and D-2 were placed in the oven at 60° C. for 3 hours. Then, whether the plywood of D-1 plywood generates cracks was checked, and a tensile test was performed on the wood specimen D-2. In test 3, after the wood specimens D-1 and D-2 were soaked in 100° C. boiling water for 4 hours, the wood specimens D-1 and D-2 were placed in the oven at 60° C. for 20 hours. Then, whether the plywood of D-1 plywood generates cracks was checked, and a tensile test was performed on the wood specimen D-2. In test 4, after the wood specimens D-1 and D-2 were soaked in 100° C. boiling water for 4 hours, the wood specimens D-1 and D-2 were placed in the oven at 60° C. for 20 hours. Following that, the wood specimens D-1 and D-2 were soaked in 100° C. boiling water for 4 hours and then were placed in the oven at 60° C. for 3 hours. Then, whether the plywood of D-1 generates cracks was checked, and a tensile test was performed on the wood specimen D-2. The tensile test employs a double column tensile testing machine (Cometech Testing Machines Co., Ltd.).

Comparison Example 2

After 15.0 g of water solution I was added to 31.26 g of styrene-butadiene rubber resin (TK-61F, manufactured by Croslene Chemical Industries. Ltd., PH=8.5, solid content 48%, viscosity 62 cps) and stirred uniformly, 15 g of flour were further added thereto and together were stirred uniformly to form a wood adhesive E.

Then, the viscosity of the wood adhesive E was measured with a viscometer 30 minutes after the wood adhesive E was formed ([test 1]). If the viscosity was between 3,000 and 15,000 cps, the wood adhesive may be smoothly used for roller coating; otherwise, the wood adhesive may not be smoothly used for roller coating.

Meanwhile, a water resistance test for wood adhesion was performed on the wood adhesive E. Firstly, wood specimens E-1 and E-2 were prepared.

The wood adhesive E was coated on four 30 cm×30 cm *eucalyptus* veneers with a coating roller (coating amount 1.1 g/cm$^2$). Then, an uncoated veneer was prepared, and the four coated *eucalyptus* veneers together with the uncoated veneer were stacked with the fiber directions being perpendicular to each other. Then, the five stacked veneers were cool-pressed (10 kg/cm$^2$) at room temperature for 50 minutes, and were further hot-pressed and hardened (10 kg/cm$^2$) at 110° C. for 20 minutes to form a five-layer plywood. Then, the specimen was cut at a size of 7.5 cm×7.5 cm to form the wood specimen E-1.

The wood adhesive E was coated between two wood chips, wherein the coating area was 1 cm$^2$, the coating amount was 1.1 g/cm$^2$, and each wood chip was a 10 cm×1 cm strip such that universal testing machine can conveniently perform a tensile test on the wood chips. After the wood chips were stacked, the stacked wood chips were cold-pressed (10 kg/cm$^2$) at room temperature for 50 minutes, and were further hot-pressed and hardened (10 kg/cm$^2$) at 110° C. for 20 minutes to form the wood specimen E-2.

Then, a water resistance test for wood adhesion was performed on the wood specimens E-1 and E-2 ([test 2], [test 3] and [test 4]). In test 2, after the wood specimens E-1 and E-2 were soaked in 70° C. warm water for 2 hours, the specimens E-1 and E-2 were placed in the oven at 60° C. for 3 hours. Then, whether the plywood of E-1 plywood generates cracks was checked, and a tensile test was performed on the wood specimen E-2. In test 3, after the wood specimens E-1 and E-2 were soaked in 100° C. boiling water for 4 hours, the specimens E-1 and E-2 were placed in the oven at 60° C. for 20 hours. Then, whether the plywood of E-1 plywood generates cracks was checked, and a tensile test was performed on the wood specimen E-2. In test 4, after the wood specimens E-1 and E-2 were soaked in 100° C. boiling water for 4 hours, the specimens E-1 and E-2 were placed in the oven at 60° C. for 20 hours, and again the specimens E-1 and E-2 were soaked in 100° C. boiling water for 4 hours and then were placed in the oven at 60° C. for 3 hours. Then, whether the plywood of E-1 generates cracks was checked, and a tensile test was performed on the wood specimen E-2. The tensile test employs a double column tensile testing machine (Cometech Testing Machines Co., Ltd.).

Comparison Example 3

After 1.33 g of NaOH water solution (10%) were added to 31.26 g of styrene-butadiene rubber resin (TK-61F, manufactured by Croslene Chemical Industries. Ltd., PH=8.5, solid content 48%, viscosity 62 cps) and stirred uniformly, 40.0 g of polyamidoamine-epichlorohydrin resin water solution (Kymene® 557H, manufactured by Hercules Ltd., PH=4.2, solid content 12.5%) and 15 g of flour were further added thereto and together were stirred uniformly to form a wood adhesive F.

Then, the viscosity of the wood adhesive F was measured with a viscometer 30 minutes after the wood adhesive F was formed ([test 1]). If the viscosity was between 3,000 and 15,000 cps, the wood adhesive may be smoothly used for roller coating; otherwise, the wood adhesive may not be smoothly used for roller coating.

Meanwhile, a water resistance test for wood adhesion was performed on the wood adhesive F. Firstly, wood specimens F-1 and F-2 were prepared.

The wood adhesive F was coated on four 30 cm×30 cm *eucalyptus* veneers with a coating roller (coating amount 1.1 g/cm$^2$). Then, an uncoated veneer was prepared, and the four coated *eucalyptus* veneers together with the uncoated veneer were stacked with the fiber directions being perpendicular to each other. Then, the five stacked veneers were cool-pressed (10 kg/cm$^2$) at room temperature for 50 minutes, and were further hot-pressed and hardened (10 kg/cm$^2$) at 110° C. for 20 minutes to form a five-layer plywood. Then, the specimen was cut at a size of 7.5 cm×7.5 cm to form the wood specimen F-1.

The wood adhesive F was coated between two wood chips, wherein the coating area was 1 cm$^2$, the coating amount was 1.1 g/cm$^2$, and each wood chip was a 10 cm×1 cm strip such that universal testing machine can conveniently perform a tensile test on the wood chips. After the wood chips were stacked, the stacked wood chips were cold-pressed (10 kg/cm$^2$) at room temperature for 50 minutes, and were further hot-pressed and hardened (10 kg/cm$^2$) at 110° C. for 20 minutes to form the wood specimen F-2.

Then, a water resistance test for wood adhesion was performed on the wood specimens F-1 and F-2 ([test 2], [test 3] and [test 4]). In test 2, after the wood specimens F-1 and F-2 were soaked in 70° C. warm water for 2 hours, the wood specimens F-1 and F-2 were placed in the oven at 60° C. for 3 hours. Then, whether the plywood of F-1 plywood generates cracks was checked, and a tensile test was performed on the wood specimen F-2. In test 3, after the wood specimens F-1 and F-2 were soaked in 100° C. boiling water for 4 hours, the wood specimens F-1 and F-2 were placed in the oven at 60° C. for 20 hours. Then, whether the plywood of F-1 plywood generates cracks was checked, and a tensile test was performed on the wood specimen F-2. In test 4, after the wood specimens F-1 and F-2 were soaked in 100° C. boiling water for 4 hours, the wood specimens F-1 and F-2 were placed in the oven at 60° C. for 20 hours. Following that, the wood specimens F-1 and F-2 were soaked in 100° C. boiling water for 4 hours and then were placed in the oven at 60° C. for 3 hours. Then, whether the plywood of F-1 generates cracks was checked, and a tensile test was performed on the wood specimen F-2. The tensile test employs a double column tensile testing machine (Cometech Testing Machines Co., Ltd.).

Comparison Example 4

15 g of flour were added to 31.26 g of styrene-butadiene rubber resin (TK-61F, manufactured by Croslene Chemical Industries. Ltd., PH=8.5, solid content 48%, viscosity 62 cps) and together were stirred uniformly to form a wood adhesive G.

Then, the viscosity of the wood adhesive G was measured with a viscometer 30 minutes after the wood adhesive G was formed ([test 1]). If the viscosity was between 3,000 and 15,000 cps, the wood adhesive may be smoothly used for roller coating; otherwise, the wood adhesive may not be smoothly used for roller coating.

Meanwhile, a water resistance test for wood adhesion was performed on the wood adhesive G. Firstly, wood specimens G-1 and G-2 were prepared.

The wood adhesive G was coated on four 30 cm×30 cm *eucalyptus* veneers with a coating roller (coating amount 1.1 g/cm$^2$). Then, an uncoated veneer was prepared, and the four coated *eucalyptus* veneers together with the uncoated veneer were stacked with the fiber directions being perpendicular to each other. Then, the five stacked veneers were cool-pressed (10 kg/cm$^2$) at room temperature for 50 minutes, and were further hot-pressed and hardened (10 kg/cm$^2$) at 110° C. for 20 minutes to form a five-layer plywood. Then, the specimen was cut at a size of 7.5 cm×7.5 cm to form the wood specimen G-1.

The wood adhesive G was coated between two wood chips, wherein the coating area was 1 cm$^2$, the coating amount was 1.1 g/cm$^2$, and each wood chip was a 10 cm×1 cm strip such that universal testing machine can conveniently perform a tensile test on the wood chips. After the wood chips were stacked, the stacked wood chips were cold-pressed (10 kg/cm$^2$) at room temperature for 50 minutes, and were further hot-pressed and hardened (10 kg/cm$^2$) at 110° C. for 20 minutes to form the wood specimen G-2.

Then, a water resistance test for wood adhesion was performed on the wood specimens G-1 and G-2 ([test 2], [test 3] and [test 4]). In test 2, after the wood specimens G-1 and G-2 were soaked in 70° C. warm water for 2 hours, the wood specimens G-1 and G-2 were placed in the oven at 60° C. for 3 hours. Then, whether the plywood of G-1 plywood generates cracks was checked, and a tensile test was performed on the wood specimen G-2. In test 3, after the wood specimens G-1 and G-2 were soaked in 100° C. boiling water for 4 hours, the wood specimens G-1 and G-2 were placed in the oven at 60° C. for 20 hours. Then, whether the plywood of G-1 plywood generates cracks was checked, and a tensile test was performed on the wood specimen G-2. In test 4, after the wood specimens G-1 and G-2 were soaked in 100° C. boiling water for 4 hours, the wood specimens G-1 and G-2 placed in the oven at 60° C. for 20 hours. Following that, the wood specimens G-1 and G-2 were soaked in 100° C. boiling water for 4 hours and then were placed in the oven at 60° C. for 3 hours. Then, whether the plywood of G-1 generates cracks was checked, and a tensile test was performed on the wood specimen G-2. The tensile test employs a double column tensile testing machine (Cometech Testing Machines Co., Ltd.).

The test results of [Example 3], [Comparison Example 2], [Comparison Example 3] and [Comparison Example 4] were shown in Table 2. It can be known from Table 2 that if the wood adhesive does not include the water solution I (the sodium carboxymethyl cellulose) or the polyamidoamine-epichlorohydrin resin (the polymeric quaternary amine) water solution, it will be inconvenient for the wood adhesive to roller-coating, and the water resistance will drop significantly.

TABLE 2

| Composition formula and test result | Example 3 | | Comparison Example 2 | | Comparison Example 3 | | Comparison Example 4 | |
|---|---|---|---|---|---|---|---|---|
| | Amoun actually added (g) | Weight Ratio by 100% solid content | Amoun actually added (g) | Weight Ratio by 100% solid content | Amoun actually added (g) | Weight Ratio by 100% solid content | Amoun actually added (g) | Weight Ratio by 100% solid content |
| Water solution I | 15 | 0.3 | 15 | 0.3 | 0 | 0 | 0 | 0 |
| styrene-butadiene rubber resin | 31.26 | 3 | 31.26 | 3 | 31.26 | 3 | 31.26 | 3 |
| Kymene ® 557H water solution | 40 | 1 | 0 | 0 | 40 | 1 | 0 | 0 |
| Flour | 15 | 3 | 15 | 3 | 15 | 3 | 15 | 3 |
| Test 1 | Successful (4810 cps) | | Failed (20080 cps) | | Failed (1060 cps) | | Failed (2060 cps) | |
| Test 2 Cracks? | N | | N | | N | | N | |
| Tension (g/cm$^2$) | >12.3 (broke up) | | >14.1 (broke up) | | >11.3 (broke up) | | >13.3 (broke up) | |
| Test 3 Cracks? | N | | Y | | N | | Y | |
| Tension (g/cm$^2$) | >14.3 (broke up) | | 1.6 | | >13.1 (broke up) | | 1.2 | |
| Test 4 Cracks? | N | | Y | | Y | | Y | |
| Tension (g/cm$^2$) | >13.6 (broke up) | | 0 | | 0.5 | | 0 | |

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A wood adhesive, consisting of:
    a first agent, consisting of:
        a sodium carboxymethyl cellulose having a molecular weight between 15,000 and 500,000 and a degree of substitution of from 0.4 and 2.00 of the sodium salt; and
        a styrene-butadiene rubber polymer; and
    a second agent, consisting of:
        a polymeric quaternary amine and NaOH, wherein a ratio of the weight of the styrene-butadiene rubber polymer to the sum of weights of the sodium carboxymethyl cellulose and the polymeric quaternary amine is in the range from 0.05:1 to 1:0.1.

2. The wood adhesive according to claim 1, wherein a weight ratio of the first agent to the second agent is in the range from 0.25:1 to 1:0.05.

3. The wood adhesive according to claim 1, wherein a weight ratio of the first agent to the second agent is in the range from 0.7:1 to 1:0.2.

4. The wood adhesive according to claim 1, wherein a weight ratio of the sodium carboxymethyl cellulose to the polymeric quaternary amine is in the range from 0.05:1 to 1:0.05.

5. The wood adhesive according to claim 1, wherein
the first agent further comprises water, and the sodium carboxymethyl cellulose and the styrene-butadiene rubber polymer exist in aqueous phase, and
the second agent further comprises water, and the polymeric quaternary amine exists in aqueous phase.

6. The wood adhesive according to claim 1, wherein the polymeric quaternary amine is formed by the reaction of polyamidoamine with epichlorohydrin.

7. The wood adhesive according to claim 1, further comprising at least one of an inorganic substance and an organic filler.

8. The wood adhesive according to claim 7, wherein the inorganic substance comprises flame retardant, and the organic filler comprises at least one of flour, starch and sawdust.

9. The wood adhesive according to claim 1, wherein the styrene-butadiene rubber polymer comprises carboxylate anion (—COO$^-$).

* * * * *